UNITED STATES PATENT OFFICE.

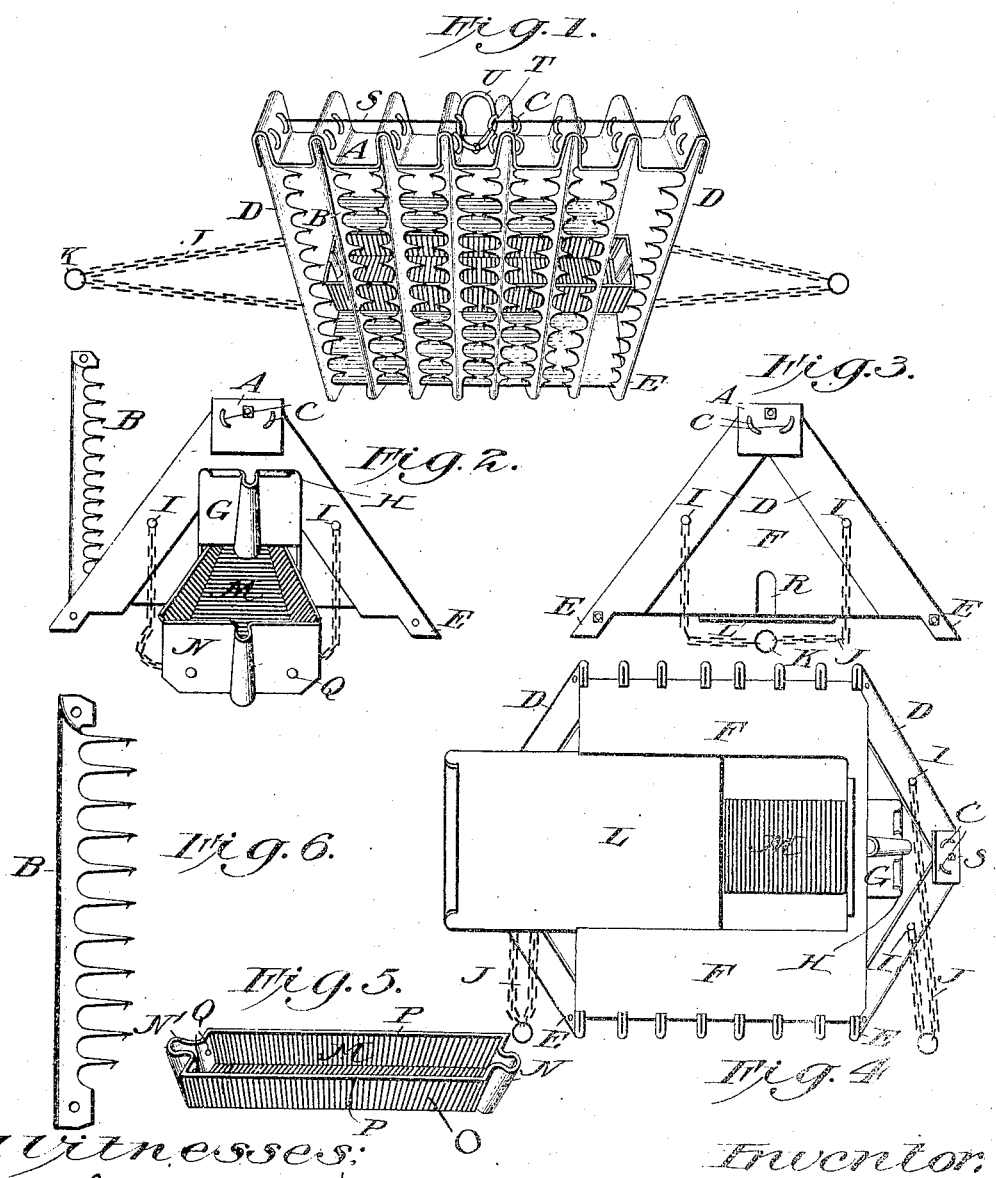

CHARLES CLARK, OF BOISSEVAIN, MANITOBA, CANADA.

TRAP.

938,743.

Specification of Letters Patent.

Patented Nov. 2, 1909.

Application filed February 13, 1909. Serial No. 477,709.

*To all whom it may concern:*

Be it known that I, CHARLES CLARK, a resident of the town of Boissevain, in the Province of Manitoba, Canada, have invented certain new and useful Improvements in Traps.

This invention relates to improvements in devices to entrap animals, birds, fish or reptiles and is specially designed for catching and holding any part of the prey it comes in contact with.

One of the principal objects of my invention is to provide a trap of this character which shall be adapted to catch and hold one or more of the prey intended to be entrapped by imprisonment or by impalement.

In the accompanying drawings, Figure 1 is a perspective view of a trap constructed in accordance with my invention. Fig. 2 is an elevation of one end with end door raised and bait dish partly withdrawn. Fig. 3 is an elevation of the opposite end showing slot for tongue of bait dish. Fig. 4 is a plan of the bottom of the trap. Fig. 5 is a perspective view of the bait dish. Fig. 6 is a view of one barbed toothed rib B.

In the embodiment illustrated, and as shown in the drawings, the trap comprises frame F, which constitutes the base and ends, the former being rectangular in shape provided with any given number of slots in two opposite sides, eight in the present instance however, having the intervening ends of metal between slots bent under in circular shape, the same admitting of the passage for bolts E. A large aperture occupies the central portion of the base and has both side edges bent outward, forming a slide for inward turned corresponding edges of door L, the latter having one end edge turned downward to serve for handle. Both ends of frame F are bent upward from the base and are triangular in form as shown in Figs. 2 and 3. Central in each end of frame F with the lower edge on a plane with the base, is an aperture for operation of bait dish, one of the said apertures having both side and lower edges turned outward, and provided with a door G, the latter having inward turned side edges thus forming a vertically inclined sliding door with the inward turned lower edges of aperture limiting the downward movement. The said door G has a groove or recess in the center parallel with turned edges to receive tongue on bait dish, and a rivet H over which the top edges are bent, serves for a handle to operate and prevent spreading of the groove. Aperture R is situated in the opposite end of frame and receives tongue N on bait dish. Central between the base and top close to the outer or inclined edge of ends are holes for anchor chain eyes I.

The top extremities of each triangular shaped end are bent downward and inward and have holes for rings C and brace rod S, over which fit end ribs D and backbone A. The latter has a longitudinal horizontally disposed strip of metal with transversely alined grooves or recesses, each groove having holes for the reception of rings C and equally distant apart, the distance between grooves being greater than the distance between slots in frame F thus giving a wider space between the ribs at the top than at the base as shown in Fig. 1. Both end grooves in backbone A have an additional hole for brace rod S.

The ribs B each consist of an angular piece of metal provided on both longitudinal edges with a plurality of finely pointed barbed teeth, the barb being a notch close to the point on the lower edge of each tooth with the projecting point diverse to that of the tooth, all ribs B have teeth on both longitudinal edges. End ribs D have teeth on one or inner side only and have holes in the center of the outer side for eyes I corresponding with the same in frame F.

All ribs are provided with holes near their upper ends for rings C and shouldered to allow of a limited portion entering grooves in backbone A, the lower end of all ribs have holes for bolt E and occupy slots in frame F, being secured in their relative positions by passing bolt E through each rib and portion of frame at the respective places. All ribs B are hinged or pivoted on bolt E. End ribs D are stationary and fit over end edges of frame F. All ribs are inserted into grooves of backbone A and locked with rings C in the manner hereinafter described.

Rings C have an opening which fits down over grooves on backbone A, the most convenient end of ring being inserted into holes, then turned until opening comes on top and when ring is pushed down on groove, locks securely.

To prevent trap from moving or overturning when in use, anchor chains J are attached to a ring K and eyes I, the latter being inserted into holes in ribs D and frame F, and are secured to the said frame on the inner side, and through the medium of rings K this trap can be secured in position by any simple means.

For the purposes of inducement to prey, a dish or receptacle to receive bait is used comprising an open retangular frame O of small wire rod over which are bent the top edges of netting M and secured on each side by a longitudinal strip of metal P closed firmly around. Each tongued-end N is one piece of metal slotted sufficiently on the inner side for metal used in tongue. Both slotted ends are bent inward over frame O and netting M on the ends of dish and secured by two rivets Q at each end. For conveyance and to prevent spreading of grooves in backbone A two small rods S are attached to a ring U. Connected to the lower part of the latter and backbone A is a small eye T. Both rods S have threaded ends for the reception of nuts on the outside of end grooves on backbone A.

The purpose of having spaces of greater width at the upper end of ribs, is for the entrance of prey of various sizes, the inclined angle of ribs causes teeth to have a downward and inward angle insuring a smooth downward and inward entrance of prey. The combined angular arrangement of teeth prevents the withdrawal of any part of prey, once that part has encroached beyond points of said teeth which are barbed for the purpose of securely impaling victim.

This trap is designed chiefly to entrap the smaller animals such as rats, gophers, etc. by impalement or imprisonment as an inducement to larger animals such as a wolf or fox.

This trap can be placed over live bait by withdrawing door L and bait dish, the majority of larger animals have a tendency to use their paw to extract bait and smaller animals generally approach bait head foremost so that it is apparent that this trap effectually protects its own bait and is always set ready for use.

Various changes in the form, proportion and the minor details of construction may be resorted to without departing from the principle or sacrificing any of the advantages of this invention.

Having described my invention, what I claim as new and desire to secure by Letters Patent is:—

In a trap of the character described the combination with a frame comprising a horizontally disposed rectangular base and vertically inclined triangular ends, each of the said ends having an aperture, a sliding door to close one of the said apertures, said base having an aperture in the central portion thereof and a sliding door to close the same, and provided on two opposite sides with parallel slots, of a series of downwardly and outwardly inclined ribs forming the sides of the trap, each of said ribs provided with a plurality of barbed teeth and the lower ends adapted to be received in slots in the said base, bolts to pivotally connect the ribs to the base, a horizontally disposed grooved backbone connected to the upper portion of said triangular ends, rings for locking the upper ends of said ribs when the ribs are inserted into grooves of the backbone, a tongued end bait dish operated through the medium of the apertures in the triangular ends and anchor chains attached to each of the triangular ends, substantially as set forth.

CHARLES CLARK.

Signed in the presence of—
HERBERT JOHN FOSTER,
WILLIAM DE MAMBEY.